(12) United States Patent
Cais et al.

(10) Patent No.: US 10,626,623 B2
(45) Date of Patent: Apr. 21, 2020

(54) SEPARATING MEMBRANE WITH IMPROVED ADHESION AND PROCESS FOR OBTAINING IT

(71) Applicant: TEMA—TECHNOLOGIES AND MATERIALS SRL, Vittorio Veneto (TV) (IT)

(72) Inventors: Federico Cais, S. Vendemiano (IT); Nicola Busatta, Vendemiano (IT); Renato Pavan, Vittorio Veneto (IT)

(73) Assignee: TEMA—TECHNOLOGIES AND MATERIALS SRL, Vittorio Veneto (TV) (IT)

( * ) Notice: Subject to any disclaimer, the term of this patent is extended or adjusted under 35 U.S.C. 154(b) by 214 days.

(21) Appl. No.: 15/528,676

(22) PCT Filed: Jan. 26, 2016

(86) PCT No.: PCT/IB2016/000055
§ 371 (c)(1),
(2) Date: May 22, 2017

(87) PCT Pub. No.: WO2016/120711
PCT Pub. Date: Aug. 4, 2016

(65) Prior Publication Data
US 2017/0260757 A1   Sep. 14, 2017

(30) Foreign Application Priority Data

Jan. 27, 2015 (IT) .............................. TV2015A0014
Jan. 27, 2015 (IT) .............................. TV2015A0015

(51) Int. Cl.
*E04F 15/18* (2006.01)
*B32B 5/02* (2006.01)
(Continued)

(52) U.S. Cl.
CPC .......... *E04F 15/182* (2013.01); *B29C 48/002* (2019.02); *B29C 48/0021* (2019.02);
(Continued)

(58) Field of Classification Search
CPC ......... E04F 13/00; E04F 13/047; E04F 15/18; E04F 15/182; E04F 15/186; E04F 15/185;
(Continued)

(56) References Cited

U.S. PATENT DOCUMENTS 4,917,933 A * 4/1990 Schluter ................. E04B 1/762
428/99
6,151,854 A 11/2000 Gutjahr
(Continued)

FOREIGN PATENT DOCUMENTS

| DE | 102011057125 A1 | 7/2013 |
| DE | 202012105080 U1 | 4/2014 |
| EP | 2234802 B1 | 7/2013 |

OTHER PUBLICATIONS

International Search Report for corresponding International Application No. PCT/IB2016/000055.

*Primary Examiner* — Catherine A. Simone
(74) *Attorney, Agent, or Firm* — Egbert Law Offices, PLLC

(57) ABSTRACT

Separating membrane (10) of plastic material, made up of a bossed and waterproof sheet (100) which is coupled with a permeable base layer (101); the bosses (102) are of the cylindrical type with a double diameter (D1, D2) and have such a shape and arrangement as to feature improved adhesion on both faces (110-111). The invention increases the gripping of the adhesive in order to obtain greater tear strength, on the upper face, and at the same time increases the area of contact with the base layer for a greater resistance to delamination on the lower face. In particular, inside each chamber (103) there is an internal crown (104), which
(Continued)

divides it like a necking (D2) into two superimposed compartments (105-6) having the same diameter (D1), wherein the first compartment has a depth (H1) amounting to at least ⅓ of the total (H). The invention also relates to the production process for obtaining said membrane (10).

12 Claims, 12 Drawing Sheets

(51) Int. Cl.
| | |
|---|---|
| B32B 5/00 | (2006.01) |
| B32B 3/30 | (2006.01) |
| B32B 3/28 | (2006.01) |
| B29C 48/00 | (2019.01) |
| B32B 38/06 | (2006.01) |
| B32B 27/12 | (2006.01) |
| B32B 27/32 | (2006.01) |
| B32B 33/00 | (2006.01) |
| B32B 37/00 | (2006.01) |
| B32B 7/06 | (2019.01) |
| B32B 7/12 | (2006.01) |
| B32B 5/30 | (2006.01) |
| B32B 5/26 | (2006.01) |
| B32B 5/28 | (2006.01) |
| B32B 3/26 | (2006.01) |
| B32B 5/20 | (2006.01) |
| B32B 5/24 | (2006.01) |
| B32B 37/18 | (2006.01) |
| B29K 23/00 | (2006.01) |
| B29K 105/04 | (2006.01) |
| B29K 509/00 | (2006.01) |
| B29L 31/14 | (2006.01) |

(52) U.S. Cl.
CPC ................ *B32B 3/263* (2013.01); *B32B 3/28* (2013.01); *B32B 3/30* (2013.01); *B32B 5/00* (2013.01); *B32B 5/022* (2013.01); *B32B 5/20* (2013.01); *B32B 5/245* (2013.01); *B32B 5/26* (2013.01); *B32B 5/28* (2013.01); *B32B 5/30* (2013.01); *B32B 7/06* (2013.01); *B32B 7/12* (2013.01); *B32B 27/12* (2013.01); *B32B 27/32* (2013.01); *B32B 33/00* (2013.01); *B32B 37/0076* (2013.01); *B32B 37/182* (2013.01); *B32B 38/06* (2013.01); *E04F 15/186* (2013.01); *B29K 2023/065* (2013.01); *B29K 2105/04* (2013.01); *B29K 2509/00* (2013.01); *B29L 2031/14* (2013.01); *B32B 2250/02* (2013.01); *B32B 2260/021* (2013.01); *B32B 2260/044* (2013.01); *B32B 2264/104* (2013.01); *B32B 2266/025* (2013.01); *B32B 2270/00* (2013.01); *B32B 2305/022* (2013.01); *B32B 2307/538* (2013.01); *B32B 2307/718* (2013.01); *B32B 2307/724* (2013.01); *B32B 2307/726* (2013.01); *B32B 2307/73* (2013.01); *B32B 2307/732* (2013.01); *B32B 2307/748* (2013.01); *B32B 2323/043* (2013.01); *B32B 2419/00* (2013.01); *B32B 2419/04* (2013.01); *B32B 2471/00* (2013.01)

(58) Field of Classification Search
CPC .... B32B 3/28; B32B 3/30; B32B 5/02; Y10T 428/24661
USPC .................... 428/178; 52/385, 386, 388, 389
See application file for complete search history.

(56) References Cited

U.S. PATENT DOCUMENTS

| | | | |
|---|---|---|---|
| 6,434,901 | B1 | 8/2002 | Schlueter |
| 7,536,835 | B2 | 5/2009 | Schluter |
| 2006/0201092 | A1 | 9/2006 | Saathoff et al. |
| 2011/0232217 | A1* | 9/2011 | Hartl ...................... E04F 15/18 52/309.1 |

* cited by examiner

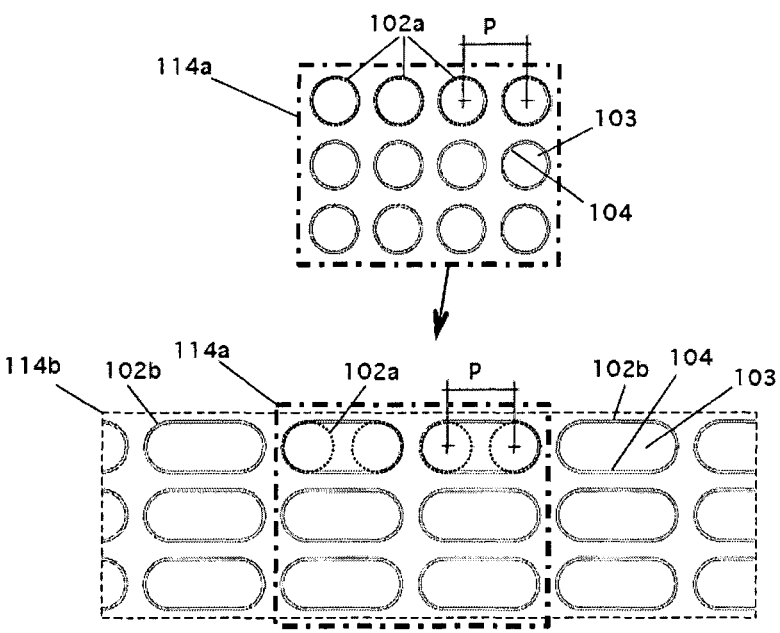
Fig. 5a
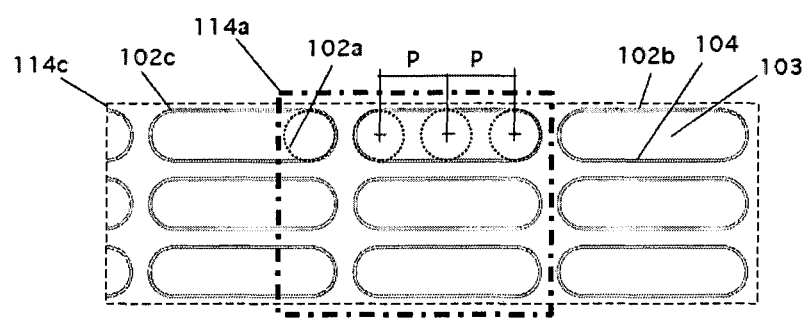
Fig. 5b
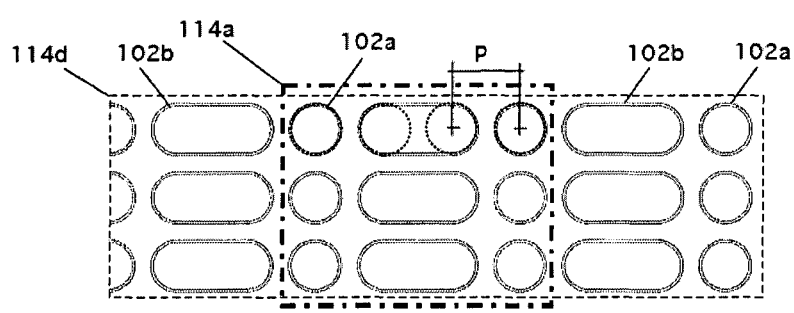
Fig. 5c
Fig. 5d

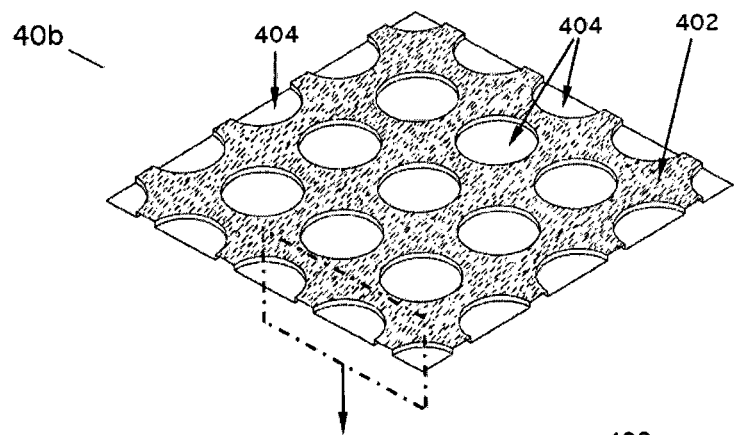
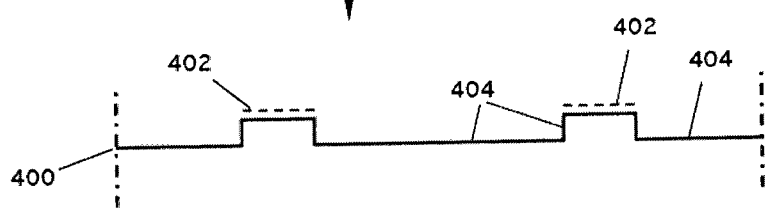
Fig. 11a
Fig. 11b
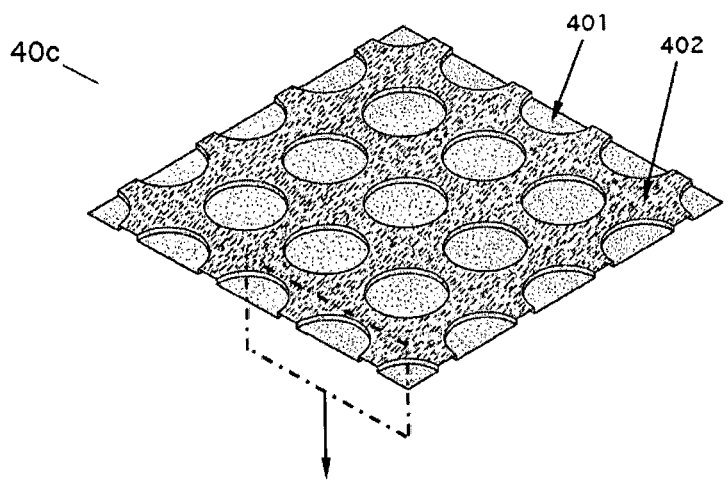
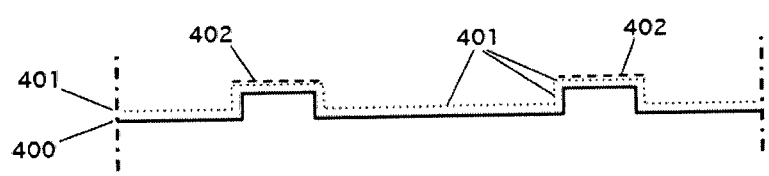
Fig. 12a
Fig. 12b

SEPARATING MEMBRANE WITH IMPROVED ADHESION AND PROCESS FOR OBTAINING IT

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a separating membrane, of plastic material, of the type with bosses with improved adhesion both on the upper face, towards the cement adhesive, and on the lower face, towards the base layer; the present invention also relates to the production process for obtaining said membrane.

2. Description of Related Art Including Information Disclosed Under 37 CFR 1.97 and 37 CFR 1.98

The present invention finds particular application in the building industry and in particular in the sector of semi-finished components for building such as, as a non-exhaustive example, the thin membranes which are intended to separate the screed from the flooring; the membrane according to the invention, more generally speaking, is suitable for the works of civil or environmental engineering, also in combination with other materials.

Nowadays, in the building sector various types of membranes are known, which have various purposes: for example, one should remember the vapour membranes, the bituminous waterproofing membranes, the drainage membranes, the geomembranes or even the separating sheets of nonwoven fabric. In particular, in modern building the waterproofing membranes are widely known, which are commonly applied by the layers of ceramic coatings, of marble slabs or anyway of coatings of the fragile type, in order to prevent cracks and detachments; such problems, in fact, sometimes occur in case of differentiated thermal expansions of the layers, or due to the movements of the floor, due to foundation microsubsidences or for any deformation of the supporting plane which is not correctly followed by the coating layer. A membrane, which is intended to prevent such problems, is conventionally called a separating membrane, or uncoupling membrane or even separating plate, being interposed like a diaphragm between the load-bearing structure and said coating in order to prevent its direct adhesion, to disperse stresses and to absorb deformations; to this purpose, particularly effective are the waterproof membranes of the bossed type which separate more the layers, distribute the point loads in a uniform way and also compensate for the vapour stresses of the subfloor.

Therefore, in professional practice it has been observed that today the most used solutions provide waterproof membranes of the bossed type, used on their own or coupled with a permeable fabric layer. In more detail, widespread are the sheets with small-sized bosses obtained on the surface in a continuous way, like cylindrical protrusions, or protrusions shaped as a truncated cone or a truncated pyramid arranged in a regular matrix, which, being intended to increase the distance between the layers, and also being intended to improve stability and adhesion, allow the cement adhesive, which is in contact with said sheet, to penetrate the interstices between the bosses or the cavities internal to the protrusions themselves, according to the positioning direction.

By way of example, the single-layer bossed sheets are widely used in underground constructions, as an element of external protection and waterproofing from the ground, and also in said cases of ceramic paving on floors of reinforced-concrete, of wood or in the screeds on the ground floor. However, for some applications, for example for a more effective drainage or to increase said separating function, the bossed sheet is also coupled with a base layer of permeable fabric, such as a nonwoven fabric of polypropylene of the type called spunbonded or spunlace; in particular, in the separating use on a reinforced-concrete screed, it is well known that such a base layer adheres well to the underlying adhesive interpenetrating it and also helps to compensate for the differentiated movements between said screed and the flooring above the bossed sheet. For example, see the drawings of the known prior art (FIGS. 1a-c) which represent a conventional separating membrane made up of a waterproof sheet provided with hollow bosses, of a cylindrical shape and arranged in a regular pitch matrix, which is also coupled on the lower side with a base layer of the permeable type of nonwoven fabric.

From the production point of view, a membrane of the bossed type is industrially obtained by extruding a sheet of plastic material which is then formed on a roller whose surface is provided with protruding bosses, which is also called bossed forming roller. In more detail as to said extrusion, there is a gravimetric feeding system which, in an automatic way, doses the raw materials directly on the hopper through which they enter the extruder; it, generally, is a heated cylinder inside which there is a worm screw that transports the melted material to the head section. Therefore, the melting of the plastic material occurs inside said extruder, where the temperature is not uniform, it being generally between 185° C. and 290° C. according to the passage zone of the melted material; the flow of said melted material is then distributed over the entire width of said head, and with the desired weight, by means of particular deviation lips which are spaced apart in an adjustable way according to the desired product. Along the screw a growing pressure is generated, from the hopper to the head, excluding a depression zone induced by a different section of said screw which allows to extract any possible volatile substances; moreover, before being cast around the forming roller, said melted material meets some filtering stations intended to block any possible impurities.

The so melted plastic material by means of a depression is cast and adheres temporarily to the bossed surface of the roller in such a way as to assume the same bossed shape and also to replicate the same smooth surface to in the zones included between one boss and another boss. The shape, the height and the pitch of the bosses which characterize the finished product can be easily varied, by replacing from time to time said bossed forming roller with a specific roller structured in the desired way. Then the so formed membrane passes through some thermal conditioning cylinders, towards an accumulator mount, to be finally conveyed to the cutting, rolling and packaging zone. If a base layer is also provided, said nonwoven fabric can be advantageously coupled during the manufacturing process of the sheet, for example by conveying it already stretched on the just made product in such a way as to exploit the residual heat of the sheet and realize several heat melting points, that is to say, in correspondence of the head of the bosses; as an alternative, it is possible to cold glue the fabric by means of adhesives laid in strips or dots.

The most suitable raw materials for this type of working are the resins of the type called olefins, and in particular polyethylene, which can be low-density, medium-density or even high-density, being called by the LDPE, MDPE and HDPE acronyms, respectively; as an alternative, polypropylene, known by the PP acronym, or thermoplastic polyolefins, known by the TPO acronym, are suitable as well. In some cases polystyrene, known by the PS acronym, is also used. Such raw materials can be either virgin or regenerated, the latter being derived from the recovery of products in the post-production or post-consumption phase.

In general, those skilled in the art know that a membrane with an uncoupling function, particularly of the type with a bossed sheet joined on the lower side to said base layer, generates the above-described advantages but also produces a considerable decrease in the values of adhesion between the flooring and the screed. In particular, both the adhesion between the bossed sheet and the overlying cement adhesive, and the adhesion between said bossed sheet and the base layer of nonwoven fabric are weak; on the other hand, the adhesion of said base layer to the underlying cement adhesive is solid and effective.

In more detail, as to the adhesion of the adhesive mortar to said sheet, it has been observed that the known and conventional solutions available on the market do not allow for a suitable adhesion to the bossed sheet of the bedding layer of the flooring and particularly in the light of the new building regulations, such as the UNI EN 1348 European standard of 2000, which specifically requires each cement adhesive on ceramic tiles to resist at least at 0.5 N/mm$^2$ following the test at 28 days, also called initial adhesion. For example, several tests have shown that a smooth polyethylene sheet, bossed in a conventional way, reaches a maximum tear strength value of 0.15 N/mm$^2$, according to said standard. In fact, it is known that a smooth polyethylene sheet does not allow for an effective chemical adhesion, and furthermore the conventional shape of the bosses, for example shaped as regular discs having a diameter of 20 mm and a depth of 3 mm, does not form a sufficient mechanical grip; such a problem generally is the cause of the localised detachments, which sometimes occur in ceramic tile flooring or anyway in small-sized coverings.

Said UNI EN 1348 European standard of 2000 provides tensile tests on specifically prepared reference samples. The adhesive is spread onto a concrete plate by means of a putty knife equipped with 6×6 mm teeth and spaced apart by 12 mm from the centre, keeping an inclination of 60°; afterwards, said tiles are applied keeping on them a weight of 20 N for 30 seconds. After the maturation of the adhesive, the tensile test is carried out with a force of 200-300 N/s, connecting the tile to an axial tensile instrument by means of interconnection systems which do not entail bending efforts.

In case of interposition of said separating membrane, the preparation of the reference samples occurs by applying on a first bedding the membrane sample being careful to exert such a pressure as to allow for a tight coupling between the cement adhesive and the layer of nonwoven fabric, if present. Therefore, one spreads out the bedding again with a toothed putty knife for the application of the tile on the sticking surface—being careful to fill the chambers of the bosses—which is then pressed with a weight of 20 N for 30 seconds. In particular, the bossed membranes of the type provided by the invention have a substantially smooth plastic sheet, which does not simplify the connection neither to said cement adhesive nor to an optional layer of nonwoven fabric coupled with it. The membranes, which are currently available on the market, reach much lower values with respect to the minimum initial adhesion value of 0.5 N/mm$^2$, a value greater than 0.2 N/mm$^2$ being already considered as good.

Furthermore, it has been observed that in the specific sector of flooring there is no reference standard for assessing the adhesion between a plastic sheet and the base layer of fabric; to this purpose, it is possible to operate by measuring the delamination force with a dynamometer. Substantially, one stresses the interface between said fabric and the bossed sheet in such a way as to originate the reciprocal detachment by delamination. In general, in the absence of regulations intended to regulate this matter, in the case of composite materials one can follow a test method prescribed for the delamination tests, which are also called peel tests, such as the EN544 European standard, which measures the so-called induced delamination. Such test provides to sample in different zones of the finished product some 10×20 cm samples, with the longer side facing the machine, and to stabilize the samples for 24 hours in laboratory, at 25° C. with 50% relative humidity. From an operative point of view, one takes the fabric layer on one side and carries out a delamination for a 10×10 cm area in such a way that the sample is half delaminated and half still adhering to the base fabric; afterwards, one inserts on the lower jaw of the dynamometer the delaminated portion of the sheet while on the upper jaw, spaced by 20 cm from the lower jaw, one inserts the delaminated portion of the fabric.

In more detail as to the measurements, one carries out a traction of the so prepared product, which will be automatically delaminated by the dynamometer by means of the stroke of the upper jaw, which moves at a fixed speed of 100 mm/min. The instrument measures the delamination force which will have a trend based on peaks, reaching the peak every time the product is delaminated in correspondence of a row of bosses; said force, which is also defined as delamination force, is equal to the peak value divided by the width of the sample, being thus expressed in N/mm. In particular, it has been observed that the membranes available on the market generally have values of about 0.1 N/mm; such values exclusively refer to the systems coupled by thermal adhesion because it is known that the glued systems generally provide higher initial values but in time, following the differences in temperature to which such products are submitted during processing, the sticking tends to detach, sometimes giving rise to interruptions of the contact between the elements with the consequent lifting of the tiles.

Recently, the companies operating in the building sector have proposed several solutions of separating membranes, which are also intended to improve the adhesion to the cement mortar by means of simplified gripping; in principle, one considers as conventional and advantageous the bossed structures with undercuts as well, like localized fixing elements once the adhesive has hardened, and also one considers as conventional and advantageous the coupling of the sheet with a permeable layer which penetrates the bedding. For example, among the most effective and widespread bossed membranes on the market we would like to recall the high-density polyethylene membrane solution by the German company Schlüter-Systems KG—Iserlohn, www.schlueter.de—marketed under the name of Ditra, which has bosses shaped as a 13 mm side square-plan truncated cone, arranged in a regular matrix with a 20 mm pitch, of the type overturned in such a way as to obtain a dovetail section, or also we would like to recall the membrane solution by the Norwegian company Isola AS—Porsgrunn, www.isola.no—marketed under the name of Platon, which has cylindrical bosses having a 13 mm diameter, arranged in a regular matrix with a 20 mm pitch, coupled with a fabric layer on both faces. However, it is widely known that such bossed membrane solutions have said problems of initial adhesion or delamination; for example, the experiments have shown that such solutions reach initial adhesion values, or pull-out values, included between 0.20 and 0.25 N/mm$^2$ with delamination peak values of about 0.1 N/mm.

For the purpose of determining the prior art related to the proposed solution, a conventional check was made, searching public archives, which has led to find some prior art documents, among which:

D1: US2006201092 (Saathoff et al.)
D2: US2011232217 (Hartl)
D3: EP2234802 (Becker)
D4: EP2246467 (Sghedoni)
D5: U.S. Pat. No. 7,536,835 (Schlueter)
D6: U.S. Pat. No. 6,434,901 (Schlueter)

D1 and D2 describe a membrane formed by a bossed sheet of the type with simple protrusions shaped as a truncated cone facing downwards, that is to say, with the cavities facing upwards, which is coupled on the lower side with a layer of nonwoven fabric and on the upper face with a net; in particular, in D1 said net is high-resistance and is stretched in a planar way in such a way as to facilitate the penetration of the bedding mortar but hinder its tearing, after hardening, while in D2 said net is coupled in adhesion with the upper face of the sheet for the purpose of increasing the adhesive effectiveness of the mortar by effect of the projections formed by said net on the surface.

D3 proposes a separating membrane formed by a bossed sheet which is coupled on both faces with a layer intended to improve the connection to the cement adhesive, being for example of a synthetic material of the nonwoven fabric type.

D4 describes a separating membrane formed by a bossed sheet coupled on the lower side with a layer of nonwoven fabric, wherein said sheet has truncated cone bosses with cavities facing upwards and wherein the upper face of the sheet is entirely covered with fibres applied by gluing like in flocking. Said sheet is manufactured by rolling using a roller with regular protrusions with a truncated cone shape; said fibres, having a length between 500 and 1000 microns, are applied by spraying in a random manner on the whole surface and on them one optionally applies a predetermined quantity of Teflon®, so as to prevent the capillary movement of water.

D5 proposes a separating membrane comprising a bossed sheet having undercuts, wherein the cavities of the bosses are facing downwards, the lower layer being permeable and being intended to be penetrated by the adhesive mortar from the screed in such a way as to remain gripped on the dovetail undercuts present in some of them, whereas on the upper face said sheet is coupled with a second layer of nonwoven fabric which acts as a planar support for the bedding mortar of the coating. Moreover, it is provided that the lower surface of the sheet has improved adhesion, being for example roughened or equipped with a rough coating.

Finally, D6 describes a separating membrane comprising a bossed sheet having undercuts, wherein the cavities of the bosses are facing upwards to be filled by the adhesive mortar of the bedding applied over it and are equipped with protrusions which protrude horizontally from the edge of the mouth towards the centre of each cavity, like a barrier, to hinder tearing once said mortar has hardened.

Therefore, it is reasonable to consider as known the solutions of separating membranes for building which are intended to separate the screed from the coating, both said membrane and said coating being laid on an adhesive mortar bedding, which comprise:

a waterproof sheet of high-density polyethylene of the roller bossed type in such a way as to form protrusions, generally of a cylindrical, truncated cone or truncated pyramid shape with a square base, which form cavities on the upper face into which the bedding adhesive mortar can penetrate;

a permeable layer of nonwoven fabric which is coupled on one side of said sheet for the purpose of joining the bedding in an integral way;

means for increasing the adhesion of the adhesive mortar to the sheet made by means of a net stretched or coupled in adhesion on the whole surface of the face, or a fabric;

means for increasing the adhesion of the adhesive mortar to the sheet, with mechanical gripping, made by means of undercuts protruding from the mouth of the cavity or by means of a high-resistance net stretched over them;

in principle, also known is the solution of improving the tear strength of an adhesive to a polymer material in sheets or plates by increasing roughness or wrinkledness, in such a way as to increase the total area corresponding to the contact surface.

To conclude, we have observed that the known solutions described have some drawbacks or anyway some limits.

In general, as described above, in the conventional and known solutions it is possible to improve both the adhesion between the bossed sheet and the overlying cement adhesive, and the adhesion between said bossed sheet and the underlying layer of nonwoven fabric.

Secondly, it has been observed that a net applied in a planar way on the upper face of the sheet, as for example in D1, effectively increases tear strength but also hinders the penetration of the adhesive mortar into the cavities, with a high cost of the product and with greater complexity of application.

Thirdly, it has been observed that the solutions with fibres made adherent to the sheet, such as the net of the conventional type as in D2 or the particular flocking as in D4, realize micro-grips of the type uniformly spread over the entire contact surface. However, it has been observed that in such cases production is not easy; in particular, for said flocked fibres one must first apply the adhesive, then spray the fibres and also, sometimes, apply a protective substance. Such a process is thus considerably longer and more expensive with respect to the conventional bossed membranes without said fibres on the upper face, also with greater costs of the materials and greater environmental costs. Furthermore, the known solutions in principle provide that the lower surface of the sheet has improved adhesion, as for example in D5, where it is generically proposed to obtain said improvement by means of a roughened surface or a surface with a rough coating; to this purpose, however, it is not described and it is not known how to industrially realize said roughening on the smooth surface of a bossed membrane, and particularly in order to obtain an effective adhesion to the adhesive, with low costs and for large production volumes.

Fourthly, in the known solutions of bossed sheet also with undercuts in the cavities, as for example in D5 and D6, it has been observed that the manufacturing process for obtaining them is not easy, since the processing cycle is longer and more complex with greater waste and also with greater investments in the equipment. The experiments have shown that, for the purpose of gripping, the protrusions constituting said undercuts are generally placed on the edge of the chamber, at the mouth, like a necking which effectively hinders the extraction of the adhesive once it has hardened but which also hinders its entry, during laying; such a configuration in professional use requires time and attention in order to prevent the incomplete filling of the chambers. Therefore, to this purpose it has been observed that a lower positioned protrusion, with respect to the mouth, is more effective, in such a way as to create a sort of guide for the adhesive to enter the chamber and facilitate the complete filling under the necking; moreover it has been observed that, for the purpose of gripping, a thin section of the restraint below said necking is sufficient, with a lower quantity of material to be introduced, while the addition of said guide at the mouth above said necking effectively contributes to increasing the contact surface and, as a consequence, the gripping.

Furthermore, it has been observed in the solutions of bossed sheet coupled with a layer of nonwoven fabric that the latter adheres to the cement adhesive also having said delamination problems and that such problems are reduced by increasing the contact surface with the fabric and increase by decreasing said contact surface. Thus, the experiments have shown that the most widespread solutions on the market have a contact area in a percentage with respect to the whole face of the membrane and corresponding to the heads of the bosses joined to the fabric which is generally between 33% and 49% of the total face; such values are reported respectively to said solutions with square bosses having a 13 mm side and with circular bosses having a 13 mm diameter, with a 20 mm pitch, respectively. Furthermore, it has been observed that it is not advantageous to increase said contact area too much because this increases said delamination values but causes a worsening of said values of initial adhesion on the opposite face; to this purpose, the experiments have shown that, on the other hand, it would be excellent to have a percentage of area of contact with the fabric, that is to say, corresponding to the heads of the bosses on the lower side, which is about between 50% and 75% of the total area of the face.

Hence the need for the companies of the sector to find solutions which are more effective with respect to the existing solutions; the aim of the present invention is also to solve the described drawbacks.

BRIEF SUMMARY OF THE INVENTION

This and other aims are achieved by the present invention according to the characteristics as in the appended claims, solving the arising problems by means of a separating membrane (10) of plastic material, made up of a bossed and waterproof sheet (100) which is coupled with a permeable base layer (101); the bosses (102) are of the cylindrical type with a double diameter (D1, D2), and have such a structure and arrangement as to have an improved adhesion on both faces (110-111). The invention increases the gripping of the adhesive for a greater tear strength, on the upper face, and at the same time increases the area of contact with the base layer for a greater resistance to delamination on the lower side. In particular, inside each chamber (103) there is an internal crown (104) which divides it like a necking (D2) into two superimposed compartments (105-6) of identical diameter (D1), wherein the first compartment has a depth (H1) equal to at least ⅓ of the total (H). The invention also relates to a production process for obtaining said membrane (10).

In this way, by the considerable creative contribution the effect of which constitutes an immediate technical progress, various advantages are achieved.

A first aim consists in realizing a separating membrane, of the bossed type, which at the same time is intended to improve both the adhesion on the lower face, for the purpose of a greater resistance to said delamination, and the gripping on the upper face, to increase said initial adhesion to the cement adhesive with respect to the conventional solutions.

A second aim consists in realizing a separating membrane with restraint elements of the type forming a necking which at the same time simplify the laying and the uniform filling of the cement adhesive inside the chambers, also under the necking, and make the gripping wider and more effective.

A third aim consists in realizing a membrane equipped with bosses having a particular structure for facilitating laying and at the same time improving adhesion, which are formed with extreme precision.

A fourth aim consists in realizing a membrane easy to be manufactured in an industrial plant with high production volumes, which is considerably more economical than the known and conventional solutions.

These and other advantages will appear from the following detailed description of some preferred embodiments with the aid of the schematic drawings enclosed, whose details of execution are not to be considered limitative but only illustrative.

BRIEF DESCRIPTION OF THE SEVERAL VIEWS OF THE DRAWINGS

FIG. 1a is an axonometric view of a portion of said membrane, FIG. 1b is a plan view, FIG. 1c is a detail section on the section plane X1-X1 of FIG. 1b.

FIG. 3b is an enlargement relating to said internal crown, of FIG. 3a.

FIG. 4b is an enlargement relating to said internal crown, of FIG. 3a.

FIGS. 5a-d show plan views of portions of separating membrane, of FIG. 2, in different configuration variants of the bosses in particular referring to a base configuration (FIG. 5a) with individually aligned cylindrical bosses with constant pitch, or even double (FIG. 5b), triple (FIG. 5c) or combined (FIG. 5d) and keeping the same position as said base configuration, the dotted perimeters of the cylindrical bosses being superimposed to facilitate understanding.

FIG. 7a shows a detail section of the membrane formed around the bossed forming roller, it being referred to the variant of FIG. 3a.

FIG. 8a shows a detail section of the membrane formed around the bossed forming roller, it being referred to the variant of FIG. 4a.

FIGS. 10a-b, 11a-b and 12a-b schematically show a bossed membrane in the roughened version, according to the present invention. In particular, FIG. 10a is an axonometric view of the roughened membrane in a first variant with porous surface, FIG. 10b being a detail section of FIG. 10a;

FIG. 11a is an axonometric view of the roughened membrane in a second variant with cut surface, FIG. 11b being a detail section of FIG. 11a;

FIG. 12a is an axonometric view of the roughened membrane in a third variant with combined porous and cut surface, FIG. 12b being a detail section of FIG. 12a.

DETAILED DESCRIPTION OF THE INVENTION

Figure 1A:
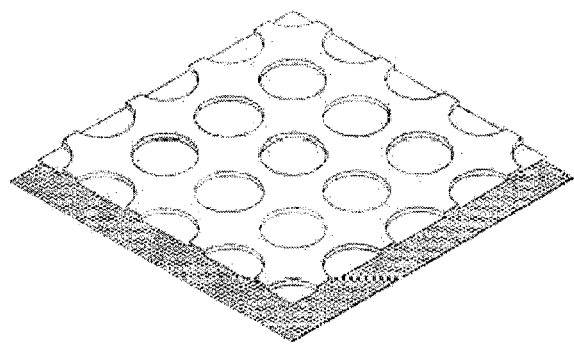
FIGS. 1a-c show a conventional membrane of plastic material with cylindrical bosses arranged with a regular pitch, also being coupled on the lower side with a base layer of nonwoven fabric, according to the prior art; in particular.
Figure 1B:
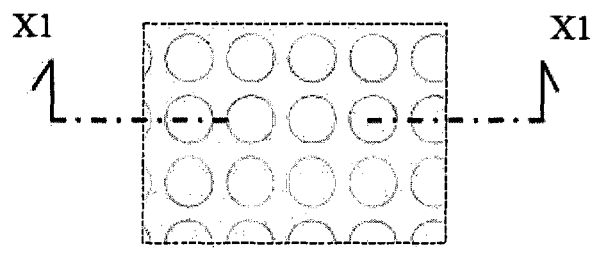
Figure 1C:
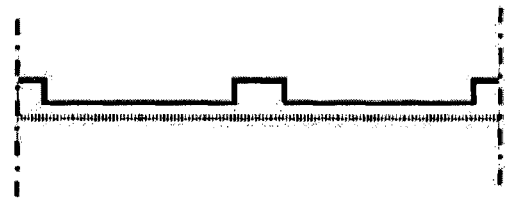
Figure 2:
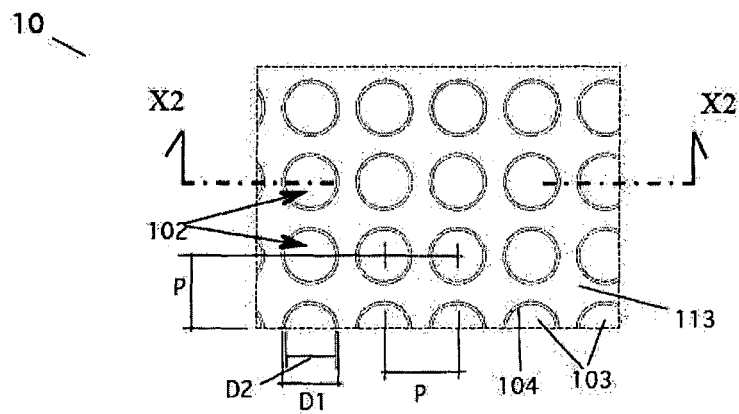
FIG. 2 shows a plan view of a portion of the separating membrane according to the invention, with undercut protrusions inside the chamber which are shaped as an internal crown.
Figure 3A:
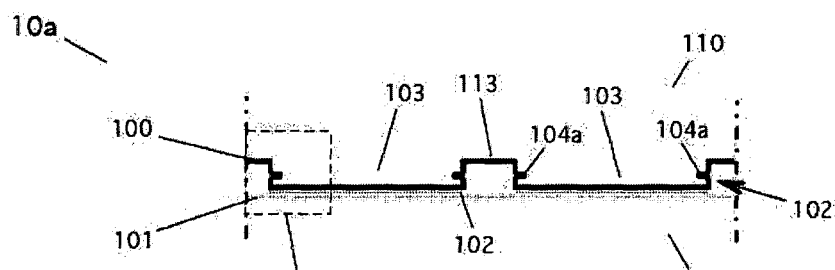
FIG. 3a is a detail section on the section plane X2-X2 of FIG. 2, in a first variant in which the internal crown has flattened edges.
Figure 3B:
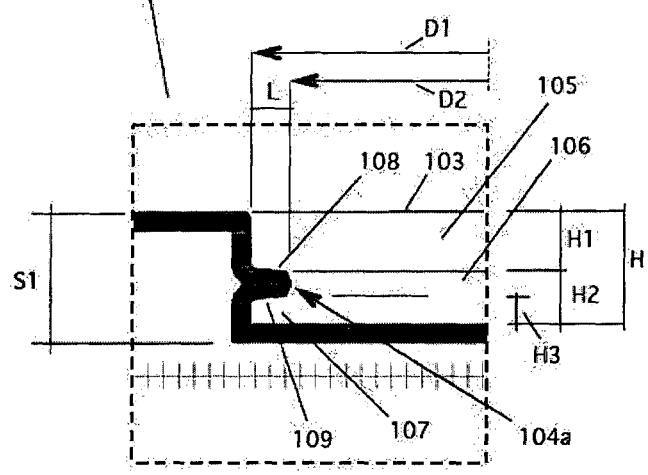
Figure 4A:
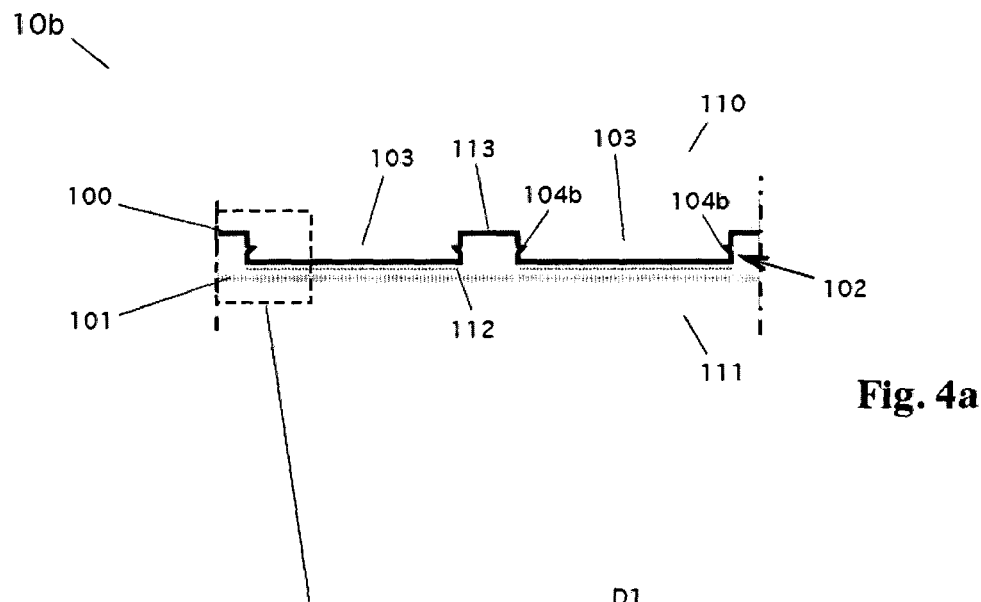
FIG. 4a is a detail section on the section plane X2-X2 of FIG. 2, in a second variant in which the internal crown has the lower edge inclined.
Figure 4B:
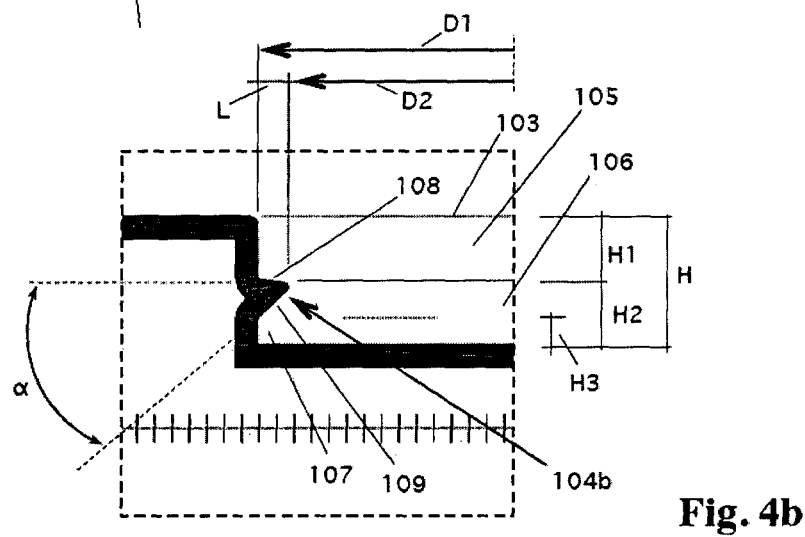
Figure 6A:
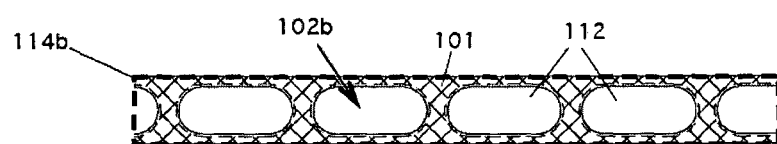
FIGS. 6a-d show plan views of the membrane portion of FIGS. 5a-b in which the contact surface between the head of the boss and the base layer is represented in contrast with respect to the non-adherent surface.
Figure 6B:
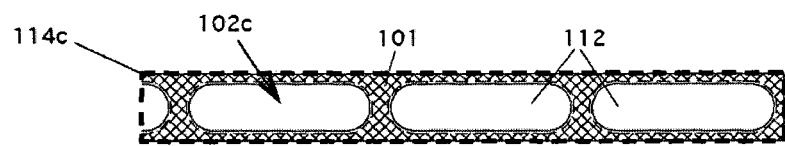
Figure 6C:
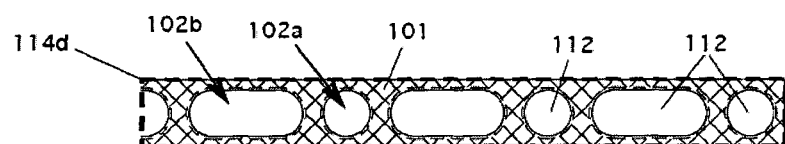
Figure 6D:
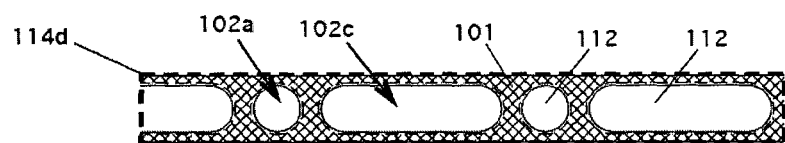
Figure 7A:
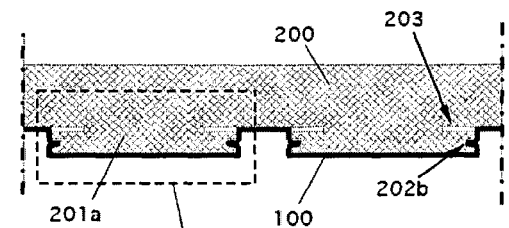
Figure 7B:
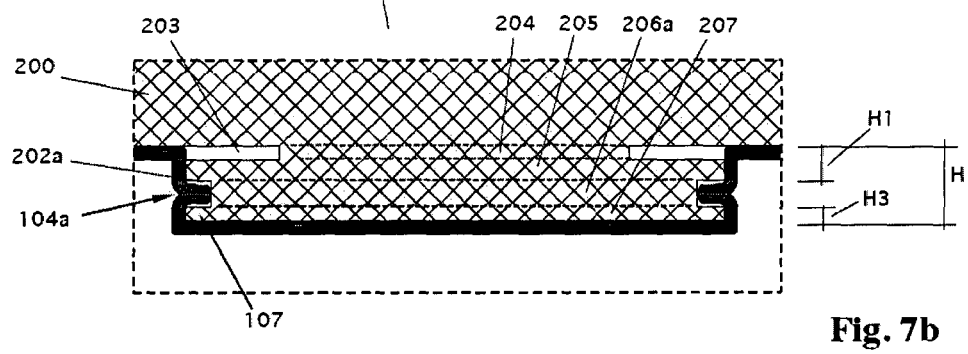
FIG. 7b is an enlargement relating to the profile of the single boss.
Figure 8A:
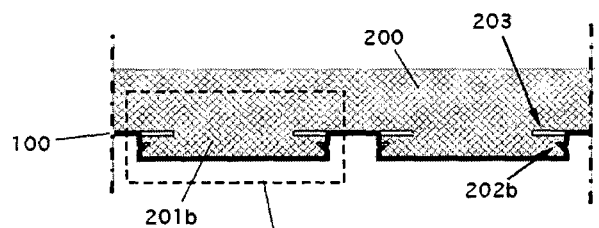
Figure 8B:
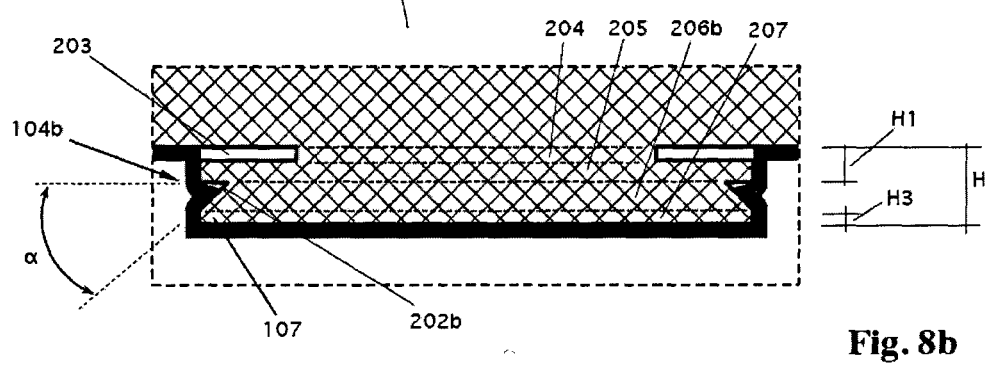
FIG. 8b is an enlargement relating to the profile of the single boss.
Figure 9:
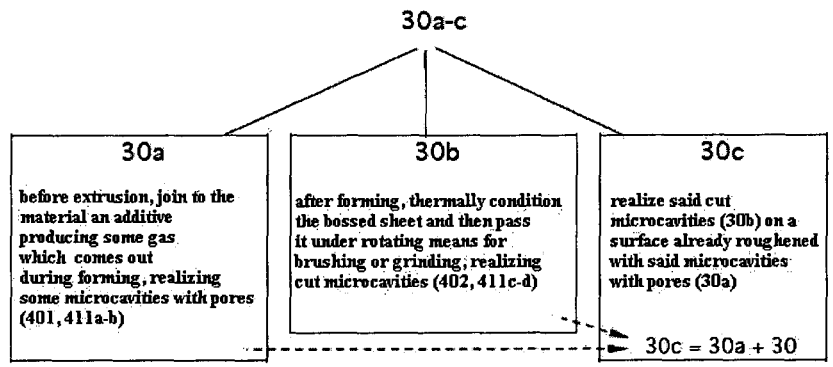
FIG. 9 is a simplified diagram of the process for roughening a bossed membrane, according to the present invention, depending on the configuration of the roughening.

With reference also to the Figures (FIGS. 2-8), the invention relates to a separating membrane (10) for building and to the industrial process for obtaining it. The structure of the membrane is of the known and conventional type, it being originated from an extruded sheet (100) of plastic material and provided with bosses (102) arranged in a matrix with a regular pitch (P), which protrude from the lower face (111) to lean on the load-bearing structure and allow the bedding layer applied on the upper face (110) to penetrate the related chambers (103), it also being coupled on the lower side, according to the prior art, with a base layer (101) of nonwoven fabric for the purpose of realizing a multi-layer membrane of the separating type. In particular, the membrane (10) provided by the invention has bosses (102-3) having a particular shape and a particular arrangement, in such a way as to have improved adhesion on both faces (110-1), thus increasing the gripping of the cement adhesive for a greater tear strength and, at the same time, increasing the contact area with the base layer for a greater resistance to delamination.

The invention provides a bossed sheet (100, 102-3) of a plastic material such as polyethylene, polypropylene or a mixture thereof; said base layer (101) is preferably of a nonwoven polypropylene fabric, of the type called spunbonded or spunlace. The thickness of the extruded sheet is directly proportional to its weight, which may range from 350 to 1000 g/m$^2$; in particular, it has been observed that to a weight of 0.9 g/m$^2$ corresponds more or less a thickness of 1 micrometre, therefore in the case of the preferred but not limitative configuration of extruded product of 500 g/m$^2$ in weight corresponds a thickness of about 550 micrometres. The total thickness (S1) of the bossed sheet (100), including the protruding bosses and the thickness of the sheet itself, is preferably of 3 mm; however, in case of particular applications it can be greater, being for example of 5 mm and up to 7 mm.

In more detail as to the particular restraint element for the adhesive of the cement type, the invention (FIGS. 2, 3a-b, 4a-b) provides that the chambers (103), obtained on the upper face (110) from the bosses (102) are equipped with an internal crown (104), having a constant width (L) of at least 0.8 mm, and preferably 1 mm, which acts as an undercut restraint element and which divides like a necking (D2) the internal space of the chamber (103, H) into at least two compartments (105-6). The first compartment (105) is cylindrical, has a diameter (D1) of 20 mm, a depth (H1) between ⅓ and ½ of the total depth (H) of the chamber (103) for the purpose of facilitating the entry of the cement adhesive and facilitate the complete filling of the chamber (103, 105-6), acting as a funnel, and increasing the contact surface; the second compartment (106) is formed by the necking (D2) in correspondence of said internal crown (104) and by the underlying and cylindrical (D1) widening (107) which simplifies restraint for the hardened adhesive, with a depth (H2) complementary to (H1) which is between ½ and ⅔ of said total depth (H). Said widening (107) having a depth (H3) at least equal to ⅙ of said total depth (H). All the above-indicated values being considered with a tolerance of +/−10%.

In particular, said internal crown (104) is made during the bossing of the extruded sheet, as described in the following, forcing it into each protrusion (201a-b) of the forming roller (200), which is laterally provided with notches (203) in such a way as to obtain two folded edges joined to each other which protrude towards the inside of the chamber (103). In a first variant (10a), said internal crown has flattened edges (108-9), that is to say pressed in a parallel way one on top of the other in a substantially orthogonal direction with respect to the side walls of the chamber (FIGS. 3a-b, 7a-b); in a second variant (10b), said internal crown has the lower edge (109) inclined by 45° with respect to the upper edge (108), leaving said underlying widening (107, D1) with a depth (H3) at least equal to ⅙ of said total depth (H), as described above (FIGS. 4a-b, 8a-b). All the above-mentioned values being considered with a tolerance of +/−10%.

In more detail as to the overall increase in the contact surface (112) with the base layer (101) stretched below said sheet (100), it is observed that said bosses are of the cylindrical type, with a greater diameter (D1) of 20 mm and arranged in a matrix with a constant pitch (P) of 26 mm; such values being considered with a tolerance of +/−10%. In this way one obtains a contact area (112) between the sheet (100) and the base layer (101), in correspondence of the heads of the bosses, which is larger with respect to the known and conventional configurations, being at least equal to 50% of the total area of the face. For the purposes of the invention, in particular, it is provided that said contact area is between 50% and 75% of the total area of the face, wherein such values are obtained by varying said base configuration (114a) (FIG. 5a), having individually aligned cylindrical bosses, that is to say, being grouped in groups of two (114b) (FIG. 5b), three (114c) (FIG. 5c) or combined (114d) (FIG. 5d) single and grouped, although always maintaining the same setting as said base configuration. Set out below are some application examples.

In a first application example, corresponding to the base configuration of the invention (10) (FIG. 2, 5a), there are provided bosses (102-3) of the cylindrical type with a double diameter (D1, D2) the external cylinder (D1) comprising said internal crown (104, D2) which subdivides the chamber (103) into the two above-described compartments (105-6). Preferably, the bossed sheet (100) is of HDPE with a total thickness (S1) of about 3 mm, with a greater diameter (D1) of the bosses of 20 mm and with a pitch (P) of 26 mm; said sheet also being thermocoupled with a base layer (101) of nonwoven polypropylene fabric and with a contact area amounting to 50% of the whole face. Said internal crown (104) can, preferably but not exclusively, be made in said two variants (10a-b) as described in the following.

As a non-exhaustive example, in a first variant of the bossing (10a) said first compartment (105) has a depth (H1) equal to ⅓ of the total (H), said second compartment (106) has a depth (H2) equal to ⅔ of the total and includes the widening (107) having a depth (H3) equal to about one third of the total; in this way one has experimentally obtained a value of resistance to the delamination between the base layer and the sheet of 0.30 n/mm, and one has also obtained a value of initial adhesion with the cement adhesive of 0.25 N/mm². Furthermore, in a second variant (10b) said first compartment has a depth (H1) equal to ½ of the total (H), said second compartment has a depth (H2) equal to ½ of the total with the widening (107) having a depth (H3) equal to about ⅙ of the total; in this way one has equally obtained a value of resistance to said delamination of 0.30 n/mm, and one has also obtained a value of said initial adhesion of 0.25 N/mm².

In an embodiment variant (114b) with respect to said base configuration (114a) (FIGS. 5b, 6a), it is provided to group two adjacent cylindrical bosses, that is to say, to replace the single bosses with pairs in the form of elongate bosses of the oval type, two by two and in the same position. Calculating the area corresponding to the head of said grouped bosses, one obtains in percentage a contact surface (112) increased from 50% to 66% with respect to the total area.

In another embodiment variant (114c) (FIGS. 5c, 6b), it is provided to group three adjacent cylindrical bosses, that is to say, to replace the single bosses with triple groups in the form of further elongate bosses of the oval type, three by three and in the same position. Calculating the area corresponding to the head of said grouped bosses, one obtains in percentage a contact surface increased to 72% with respect to the total area.

In a further embodiment variant (114d) (FIGS. 5d, 6c-d), it is provided to combine said configurations of grouped bosses, double or triple, alternating them with single bosses and in the same position. By this solution one advantageously obtains a value of said resistance to delamination of 0.40 n/mm, and one also obtains a value of said initial adhesion of 0.35 N/mm².

In another variant of the invention, in order to further increase adhesion, it is provided to roughen at least one face of said bossed sheet by means of superficial microcavities, which are open towards the outside of the surface in such a way as to allow for a gripping of the widespread type and realizing at least one of the following roughening configurations of the membrane: with porous or cut surface.

The process for industrially obtaining the above-described separating membrane includes the following operating phases: extruding the raw material in such a way as to form a thin sheet (100), said raw material consisting of at least one thermoplastic polymer or a mixture of polymers; then forming said sheet around a forming roller (200) of the bossed type, that is to say, being provided with protrusions (201) arranged in a matrix with a constant pitch (P) and a height between 2.5 mm and 7 mm, and preferably in such a way as to obtain a total thickness of the sheet (S1) of 3 mm; at the end of the forming, coupling on the lower side (111) of said sheet (100) the base layer (101) of nonwoven fabric, of the type called spunbonded. The invention, for the purpose of obtaining said bosses (102) of the cylindrical type with a double diameter (D1, D2) which also include the particular above-described internal crown (104, L), provides that each protrusion (201) of the roller (200) laterally comprises a main notch (202), shaped as a continuous cavity and orthogonal to the side walls of the boss, which is intended to fold the sheet (100) forcing its forming in such a way as to realize two folded edges (108, 109), undercut-joined, which protrude towards the inside of the chamber (103) in said first variant (10a) or in said second variant (10b) of configuration of said internal crown (104). Said main notch preferably having a width (L) of 1 mm and a height at least equal to twice the thickness of the sheet.

In a first embodiment variant of the protrusion (201a) said main notch (202a) is configured with a rectangular section, in such a way as to form said internal crown (104) with the edges (108-9) flattened one on top of the other, that is to say, pressed in a horizontal direction and namely substantially parallel to the external surface of the roller (FIGS. 3a-b, 7a-b).

In a second embodiment variant (200b) said main notch (202b) is configured with a triangular section with the lower face inclined by 45°, in such a way as to form an internal crown (104) with the lower edge (109) inclined by 45° with respect to the upper edge (108), which is substantially parallel to said roller (FIGS. 4a-b, 8a-b).

Preferably, each protrusion (201) of the roller also has a secondary notch (203), shaped as a thin and continuous cavity, placed laterally at the base of the protrusion, which substantially reduces the portion of connection of the protrusion to the roller. Said secondary notch is intended to facilitate the forming operations at the base of the boss (102) allowing the sheet (100) to adapt itself to forming, by deforming and expanding.

Said notches (202-3) subdivide the protrusion (201) into four main portions (204-7) (FIGS. 3a-b, 4a-b, 7a-b, 8a-b):
- a first portion (204) is cylindrical and is in correspondence of the secondary notch (203);
- a second portion (205) is cylindrical and corresponds to the greater diameter (D1) of the boss (102); said first and second portion (204-5) forming said upper compartment of the boss (102, H1);

- a third portion (206) is alternatively cylindrical (206a, D2) or shaped as a truncated cone (206b) and is in correspondence of said primary notch (202) to form respectively said internal crown in the two above-described embodiment variants (104a-b);
- a fourth portion (207) is cylindrical (D1) and corresponds to the greater diameter (D1) of the boss on the widening (107, H3) underlying said internal crown (104); said third and fourth portion (206-7) forming said lower compartment of the boss (106, H2).

In more detail as to said four main portions:
- said first portion is cylindrical, has a diameter between 13 mm and 18 mm and a height of 0.5 mm;
- said second portion is cylindrical, has a diameter of 20 mm and a height between 0.5 mm and a maximum height equal to ½ of the total height;
- said third portion is alternatively cylindrical, with a diameter 18 mm and a height equal to twice the thickness of the sheet (100), or is shaped as a truncated cone with an inclination of 45° starting from 18 mm up to 20 mm towards said fourth portion;
- said fourth portion is cylindrical, has a diameter of 20 mm and a maximum height equal to ⅙ of the total height of the protrusion.

Furthermore, the industrial process (30a-c) for obtaining a roughened membrane is described, said process being suitable for any bossed membrane (40a, 40b, 40c) (FIGS. 10-16) consisting of an extruded sheet of plastic material and formed around a bossed roller equipment, and being particularly suitable for the separating membrane (10a, 10b) described above (FIGS. 2-8), that is to say, according to the invention; it must be noted that said process (30a-c) can also be used to roughen any configuration of bossed membrane in correspondence of at least one face of the plastic sheet. With reference also to the schematic figures (FIGS. 9-16), enclosed for illustrative purposes only, said process (30a-c) allows to advantageously obtain a roughened membrane (10a-b, 40a-c) comprising particular roughening superficial microcavities (411a-d) which are open outwards in such a way as to realize a micro-gripping of the widespread type, for example to facilitate the adhesion of a cement adhesive; said superficial microcavities, having a depth greater than 35 micrometres, form one of the following roughening configurations: with porous surface (40a, 401) (FIGS. 10a-b), with cut surface (40b, 402) (FIGS. 11a-b) or with combined surface (40c, 401-2) (FIGS. 12a-b).

In said first configuration (FIGS. 10a-b), the roughening of the membrane (40a) occurs with a porous surface (401) wherein the microcavities are of the type with pores (411a-b) formed by the bubbles of the gas which is advantageously contained in the material constituting the sheet and which comes out in a controlled way during the production phases in such a way as to leave in the material some gaps shaped as craters (412-3) and distributed in a random way, with a homogenous distribution density, over the entire surface of the face and also in the chambers (406). In said second configuration (FIGS. 11a-b) the roughening of the membrane (40b) occurs with a cut surface (402) wherein the microcavities are of the type with cuts (411c-d) mechanically obtained in correspondence of the portions of non-protruding surface of the roughened face, that is to say, on the most external surface and not inside the chambers and namely on the non-bossed parts of the sheet. In said third configuration (FIGS. 12a-b) the roughening of the membrane (40c) occurs with a combined surface (401-2) where there are simultaneously both said porous surface (401) and said cut surface (402); in that case, said microcavities with cuts (411c-d) are mechanically made on a surface which already comprises said microcavities with pores (411a-b).

Said process (30a-c) in short provides the following operating phases: extruding the raw material in such a way as to form a sheet (400), said raw material consisting of at least one thermoplastic material or a mixture of polymers; then forming said sheet (400) around a bossed roller equipment provided with protrusions arranged in a regular matrix in such a way as to form a membrane with bosses (405); optionally realizing the coupling of a nonwoven fabric, on the face where the roughening is not provided; and wherein in particular the process provides, depending on each of said roughening configurations (40a-c) (FIG. 9):
- to obtain said first roughening configuration (40a), the process (30a) provides to join to the plastic material, before extrusion, an additive producing some gas which comes out during the forming phase, said additive being alternatively a mineral filler or a foaming agent;
- to obtain said second roughening configuration (40b), the process (30b) provides that, after the forming around the bossed roller, the bossed sheet crosses some thermal conditioning rollers where there are also some driving means which force it to pass on a working surface under rotating means which are intended to cut it mechanically, said rotating means being alternatively of the type for brushing or grinding;
- to obtain said third roughening configuration (40c), the process (30c) provides to combine said processes (30a-b) realizing mechanically said microcavities of the type with cuts (402a-b, 411c-d, 40b) on a surface which already comprises said microcavities with pores (401a-b, 411a-b, 40a).

In more detail as to the carrying out of the process (30a) for obtaining said first configuration (40a), with porous roughening surface (401), it is provided:
- in a first variant (401a) (FIGS. 13a-b), to add to the plastic material some particles of mineral filler of nanometric dimensions where 99% of the particles have a diameter smaller than 50 micrometres, in a quantity between 1% and 20% of the total raw material, and with a humidity lower than 0.5%; wherein said mineral filler is calcium carbonate;
- in a second variant (401b) (FIGS. 14a-b), to add to the plastic material a quantity of foaming agent between 0.25% and 2% of the total mixture of raw material, said foaming agent being compatibilized with said plastic matrix in such a way that at the moment of extrusion it reacts with the atmosphere; and wherein said quantity of foaming agent forms a roughened membrane of the waterproof type; wherein said foaming agent alternatively is: of the type azodicarbamide in polyethylene matrix at 0.5% in weight on extrusion of HDPE at 500 g/m$^2$, or of the type Hostatron AEL 601 in polyethylene matrix at 1.5% in weight on extrusion of HDPE at 600 g/m$^2$;
- in a further variant with respect to the previous one, to add to the plastic material a quantity of foaming agent between 2% and 5% of the total mixture of raw material in such a way as to form a roughened membrane of the permeable and microperforated type; wherein said foaming agent is alternatively of the type Hostatron AEL 601 in polyethylene matrix at 2.5% in weight on extrusion of HDPE at 600 g/m$^2$.

In more detail as to the carrying out of the process (30b) for obtaining said second configuration (40b), with cut roughening surface (402), it is provided:

in a first variant (402a) (FIGS. 15a-b) said rotating means are intended for brushing being of the type with a rotating shaft covered with metal brushes which act in such a way as to cut it forming said microcavities in the form of discontinuous grooves (411c); wherein the mouth (415) of said discontinuous grooves (411c) has a mainly circular and/or ovalized and/or irregularly polygonal shape, a depth (V2) between 35 micrometres and 200 micrometres and a width (V1) which is between 1 mm and 2 mm if measured on the diagonal in the brushing direction, and is between 0.5 mm and 1 mm if measured on the diagonal in a direction perpendicular to it; wherein said shaft is provided with said brushes over its entire width and wherein the metal bristles which make them up are spaced 2.5 mm to 5 mm from one another, with a rotational speed of the shaft higher than 1000 revolutions/minute, while the product advances at linear speeds of 3 metres/minute; wherein the removed chip (416) of each of said microcavities (411c) obtained by brushing can alternatively be left, that is to say, it is joined to the mouth (415) in a protruding way to increase the wrinkledness of the surface, or can be removed;

in a second variant (402b) (FIGS. 16a-b) said rotating means are intended for grinding being of the belt grinder type arranged in series in such a way as to cut said sheet for a depth (V2) smaller than 100 micrometres, forming multiple microcavities (411d) mainly in the form of elongate grooves, oriented in at least two different directions to form a net-like geometry, wherein the pitch (V4) between two successive and parallel grooves is between 0.1 mm and 0.2 mm and the angle ($\beta$) between a primary direction (417a) and a secondary direction (417b) is between 15° and 90°.

Figure 13A:
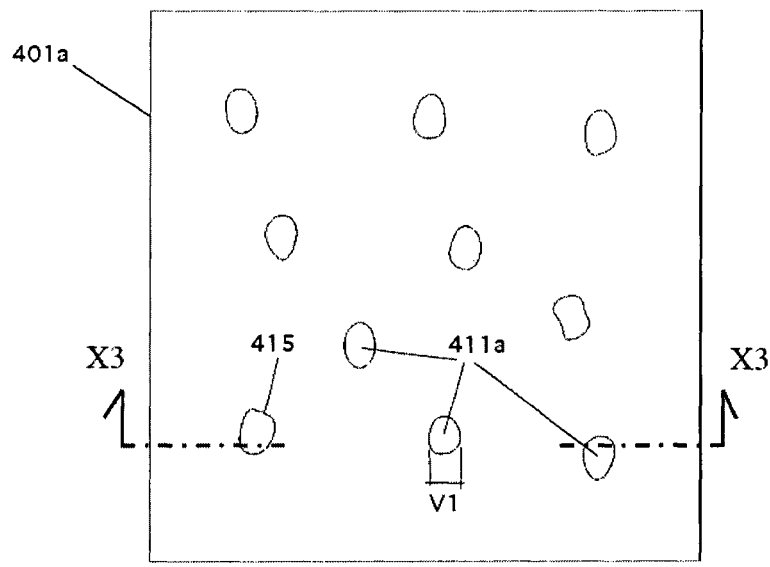
FIGS. 13a-b indicatively show enlarged orthogonal views, respectively from the top and in section X3-X3, being referred to a portion having a 3×3 mm width of the roughening porous surface as in FIGS. 10a-b, in a first variant with superficial microcavities in the form of single micropores.
Figure 13B:
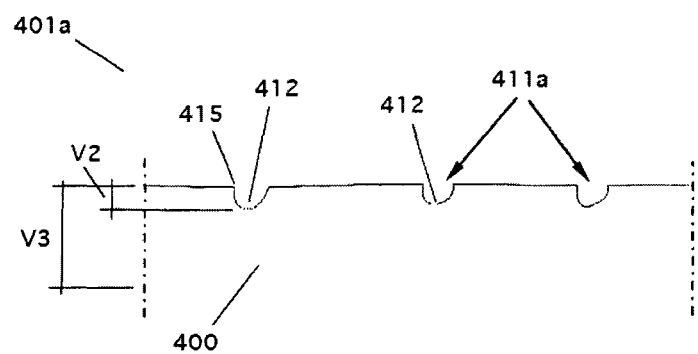

In more detail as to said porous surface (401) made by the above-described process, the first version (401a) features superficial microcavities (411a) shaped as single micropores having the crater (412) with the mouth (415) of a mainly circular shape, a width (V1) smaller than 200 micrometres and a depth (P) smaller than 95 micrometres; said superficial microcavities (411a) realizing a roughened membrane with a porous appearance of the waterproof type (FIGS. 13a-b).

Figure 14A:
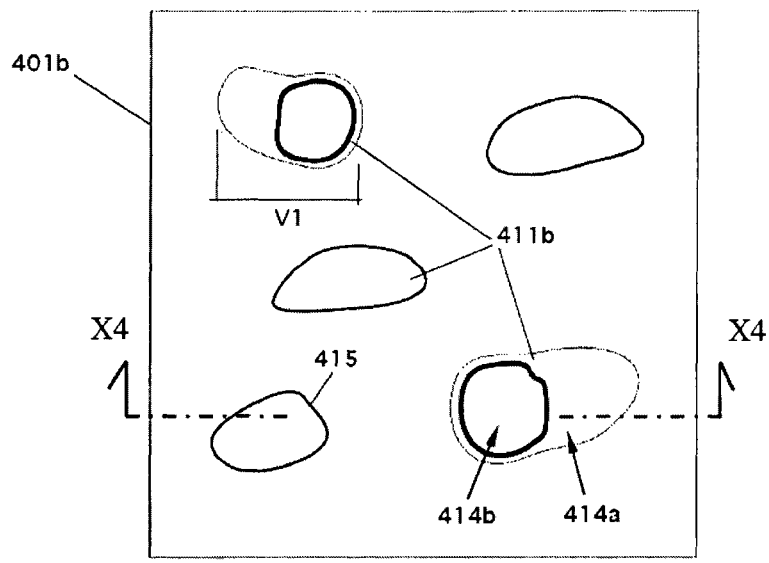
FIGS. 14a-b indicatively show enlarged orthogonal views, respectively from the top and in section X4-X4, being referred to a portion having a 3×3 mm width of the roughening porous surface as in FIGS. 10a-b, in a second variant with superficial microcavities in the form of composite pores.
Figure 14B:
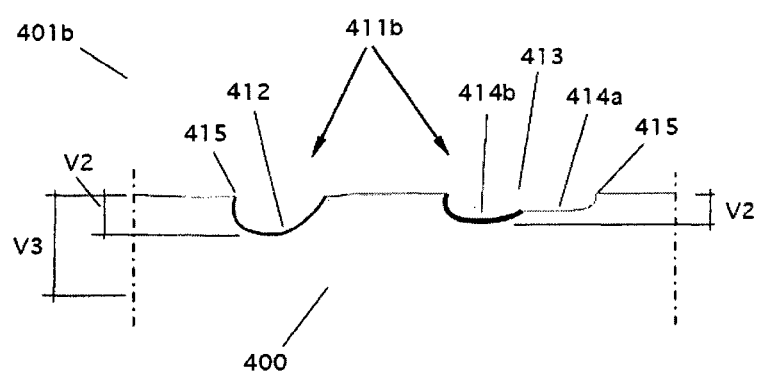
Figure 15A:
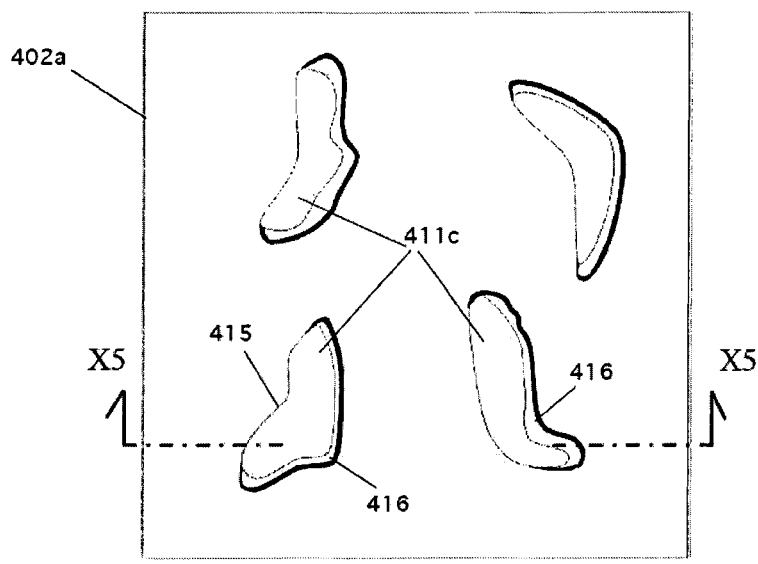
FIGS. 15a-b indicatively show enlarged orthogonal views, respectively from the top and in section X5-X5, being referred to a portion having a 3×3 mm width of the roughening cut surface as in FIGS. 11a-b, in a first variant with superficial brushing microcavities in the form of discontinuous grooves.
Figure 15B:
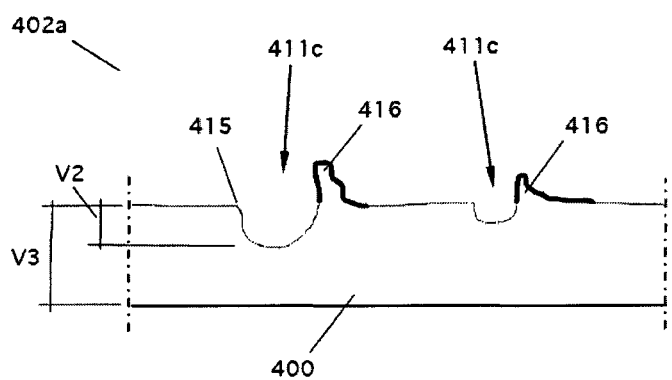

Moreover, in the second version (401b), said porous surface comprises superficial microcavities (411b) shaped as composite pores, with craters of the single type (412) and of the multiple type (413) as well; and wherein said craters of the multiple type (413) comprise at least two sub-craters (414a-b) joined to each other, being intersected and/or incorporated; and wherein said craters of the multiple type (413) have a width (V1) smaller than 300 micrometres and a depth (V2) which is variable depending on the type and on the quantity of the gas which has come out of the material and which is also variable depending on the production modes; and wherein said superficial microcavities (411b) realize a roughened membrane with a porous appearance which is of the waterproof type, if said depth (V2) is smaller than the thickness (V3) of the sheet, or is of the permeable and microperforated type if they are pass-through, that is to say, open on the lower face (410) as well (FIGS. 14a-b).

In more detail as to said cut surface (402) made by the above-described process, in a first version (402a) it comprises superficial microcavities (411c) which are made mechanically by brushing, wherein said superficial microcavities (411c) are shaped as discontinuous grooves, with the mouth (415) having a mainly circular and/or ovalized and/or irregularly polygonal shape, a depth (V2) between 50 micrometres and 200 micrometres and a width (V1) between 0.5 mm and 2 mm; said superficial microcavities (411c) realizing a roughened membrane (40c) of the waterproof type with a wrinkled appearance. Furthermore, it is provided that said superficial microcavities (411c) can have on the outside the related removed chip (416), which remains joined to the surface in correspondence of the mouth (415) without being removed completely; in this case, therefore, one obtains a roughened membrane of the waterproof type with a wrinkled appearance with an improved gripping (FIGS. 15a-b) as well.

Figure 16A:
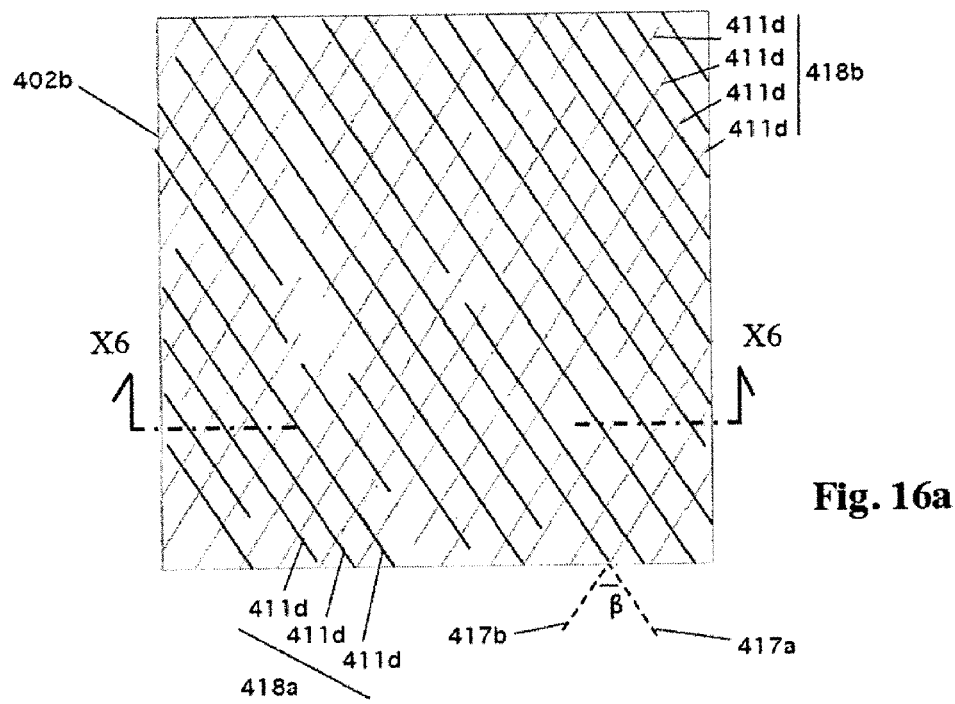
FIGS. 16a-b indicatively show enlarged orthogonal views, respectively from the top and in section X6-X6, being referred to a portion having a 3×3 mm width of the roughening cut surface as in FIGS. 11a-b, in a second variant with superficial grinding microcavities in the form of linear, elongate and parallel grooves, in oriented bundles.
Figure 16B:
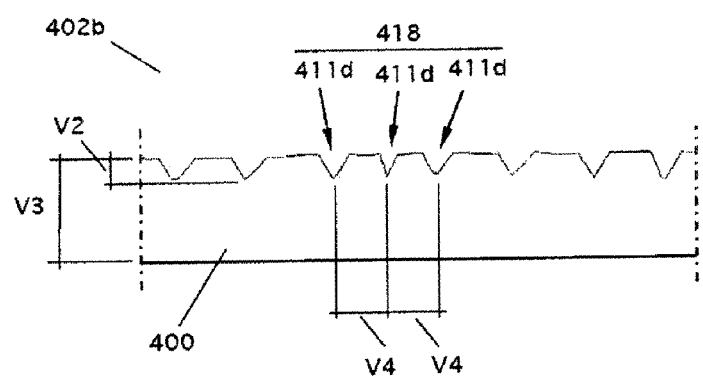

Moreover, in a second version (402b), said cut surface comprises superficial microcavities (411d) shaped as linear, elongate and oriented grooves, assimilable to continuous grooves, which are made mechanically by grinding; the superficial microcavities (411d) are distributed in a regular way being parallel and grouped in bundles (418a-b), said bundles (418a) being oriented at least according to a primary grinding direction (417a) and also intersected by other bundles (418b) according to a secondary direction (417b) which cuts through said primary direction (417a) with a relative angle ($\alpha$) which is between 15° and 90°. The depth (V2) of said superficial microcavities (411d) is between 100 micrometres and 500 micrometres; the pitch (V4) between two parallel and successive microcavities (411d) of the bundle (418a-b) is between 0.1 mm and 0.2 mm. Said superficial microcavities (411d) realize a roughened membrane of the waterproof type with a wrinkled appearance (FIGS. 16a-b).

In particular, it is observed that said superficial microcavities of the type with cuts (402, 411c-d) are made mechanically in correspondence of the external surfaces and come into contact with the cutting equipment, that is to say, in correspondence of the non-extruded portions of surface of the face outside the chambers (406) (FIGS. 11a-b).

In an alternative configuration, it is provided that said superficial microcavities (411a-d) are made both on the upper face (409) and on the lower face (410) of the sheet (400). In case of combined porous and cut surfaces, in particular, it is observed that on the lower face said superficial microcavities of the type with cuts (411c-d) are made only in correspondence of the heads (408) of said bosses (405), that is to say, on the surfaces which come into contact with the cutting equipment.

Figure 10A:
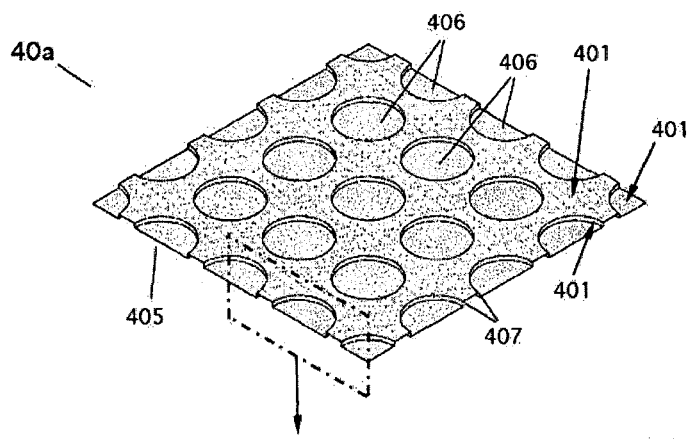
Figure 10B:
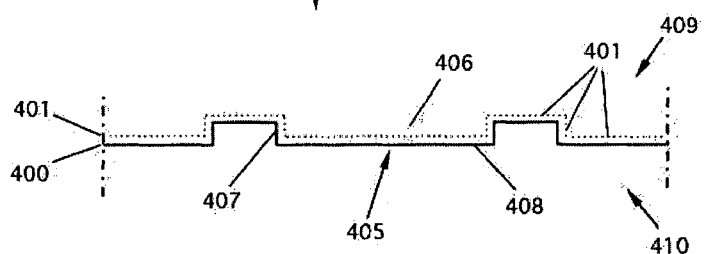

Furthermore, as to said porous surface (401) made by the above-described process, it is observed that said microcavities (411) of the type with pores (411a-b) are formed by the bubbles of a gas which is contained in the material of the sheet and has come out in a controlled way during the production process, leaving in the material some gaps shaped as small craters (412-3) and distributed in a random way with homogenous density over the entire surface of the face (409) and also inside the chambers (406) (FIGS. 10a-b). To this purpose, in the first variant (401a) of roughening with pores where said superficial microcavities (411a) are shaped as micropores (FIGS. 13a-b), it is provided to use in the raw material some mineral additives, which are also called mineral fillers, preferably calcium carbonate; in fact, experiments have shown that the use of a mineral filler leads, in the operating conditions provided by the invention, to a roughened surface with small-sized pores having a generally circular area. In the second variant (401b) of roughening with pores, on the other hand, where said superficial microcavities (411b) are shaped as composite pores with craters of the single type (412) and also of the multiple type (413), it is provided to use in the raw material some foaming agents; in fact, experiments have shown that the use of a foaming agent leads, in the operating conditions provided by the invention, to a roughened surface with larger-sized composite pores with respect to the micropores of the previous variant, both with reference to the area and to the depth (V2) of each crater, also being joined to form sub-craters (414a-b). Furthermore, it has been observed that, if said sub-craters are numerous and joined to each other inside the same microcavity, the related crater (413) has on the inside a foam-like structure of the material.

In more detail as to said first variant (401a) of roughening with pores (FIGS. 13a-b), it is provided to add to the plastic material some particles of mineral filler, preferably calcium carbonate, of nanometric dimensions, that is to say, with 99% of the particles having a diameter smaller than 50 micrometres, and being in a quantity between 1% and 20% of the total raw material, and also being with low humidity, that is to say, lower than 0.5%. In particular, it has been observed that, upon growing of the quantity of said mineral filler up to a maximum of 20% on the total raw material, one obtains superficial pores with a growing diameter, that is to say, up to 200 micrometres, and a depth (V2) up to 50 microns; substantially said superficial pores are formed because of the relative humidity present in the calcium carbonate. This phenomenon can be advantageously used for the purposes of the invention by not degassing the melted material during extrusion but allowing, and at the moment of the casting from the extrusion head, the gas microbubbles to spread out in a homogenous way in correspondence of the surface of the roller, to then come out naturally leaving on the entire hardened surface of the membrane the respective microcavities, in the form of micropores.

In more detail as to said second variant (401b) of roughening with pores (FIGS. 14a-b), it is provided to insert in the mixture of plastic materials in extrusion, a foaming agent, compatibilized with the plastic matrix, which at the moment of extrusion reacts with the atmosphere. In general, one can consider as known various foaming substances, organic or inorganic, which are used to produce low-density polymer products; such substances, once the reaction temperature has been reached, expand in an exothermic and irreversible way, releasing a gas which generates in the products of plastic material a foam-like structure.

For the purposes of the invention, in particular, experiments have shown that by applying such a foaming system directly in the extrusion with flat head for membranes, that is to say, by adding to the mixture of the raw materials a quantity of foaming agent between 0.25% and 2% of the total raw material, one obtains an extruded waterproof sheet of the rough type, characterised by the presence of microcavities whose volume and concentration are directly proportional to the percentage of foaming agent used. It has also been observed that, if dosed in greater quantities, the foaming agent may lead to the production of an extruded permeable sheet in which the cavities created by the expansion are pass-through; in fact, an addition between 2% and 5% allows to obtain a microperforated extruded sheet which is effective as a separating membrane for internal use, or even for external use if the stratigraphy provides the insertion of a drainage and waterproofing element under the screed.

In a first production example of said second variant (401b) of roughening with pores, particularly suitable for the invention is a foaming agent of the type azodicarbamide in polyethylene matrix, at 0.5% in weight, on extrusion of HDPE at 500 g/m$^2$; the so extruded membrane is no longer smooth but has a roughness extending over the entire surface of the face, and wherein each microcavity mainly has a diameter smaller than 100 micrometres and a depth (V2) smaller than 50 micrometres. In a second production example of said second variant (401b) of roughening with pores, particularly suitable for the invention is a foaming agent of the type called Hostatron AEL 601 in polyethylene matrix, at 1.5% in weight, on extrusion of HDPE at 600 g/m$^2$; the so extruded membrane is no longer smooth but has a roughness extending over the entire surface of the face, and wherein each microcavity mainly has a diameter ranging between 200 and 400 microns and a depth (V2) smaller than 50 micrometres. In a third production example, particularly suitable for the invention is a foaming agent of the type called Hostatron AEL 601 in polyethylene matrix, at 2.5% in weight, on extrusion of HDPE at 600 g/m$^2$; the extruded membrane is no longer continuous but is perforated thanks to the formation of pass-through cavities having a diameter greater than 500 microns.

Furthermore, as to said cut surface (402), it is observed that said superficial microcavities are obtained by means of a mechanical action and not an action of the chemical-physical type, as occurs for said porous surface (401), and it is also observed that the action concerns only the most external portion of the sheet, that is to say, the non-bossed part, cutting only the surface in direct contact with the cutting equipment and not that inside the chambers (406). To this purpose, in a first variant (402a), by means of brushing one creates by removal some superficial microcavities in the form of discontinuous grooves; in a second variant (402b), by means of grinding one creates by removal some superficial microcavities in the form of linear, elongate and parallel grooves, in oriented bundles, assimilable to continuous grooves.

In more detail as to said first variant (402a) of roughening by brushing (FIGS. 15a-b), once extruded and if necessary coupled with a nonwoven fabric, said sheet passes through some thermal conditioning rollers; between said rollers there is a driving system which guides the product to pass under a shaft covered with metal brushes: in fact, it has been observed that the rotation of said brushes creates on the surface of the sheet said microcavities in the form of discontinuous grooves (411c). In an advantageous production configuration, using a shaft provided with said brushes over its entire width and wherein the metal bristles which make them up are spaced 2.5 mm to 5 mm from each other, with a rotational speed of the shaft greater than 1000 revolutions/minute, while the product advances at a linear speed of 3 metres/minute, irregularly shaped grooves are formed, affecting areas having a length between 1 mm and 2 mm and a width between 0.1 mm and 0.5 mm, the dimensions being greater in the brushing direction. Such a configuration allows to obtain discontinuous grooves with the mouth (415) having a mainly circular and/or ovalized and/or irregularly polygonal shape, a depth (V2) between 50 micrometres and 200 micrometres and a width (V1) which is between 1 mm and 2 mm if measured on the diagonal in the brushing direction, and which is between 0.5 mm and 1 mm if measured on the diagonal in a direction perpendicular to it; such grooves can still be connected to the removed chip or not.

In more detail as to said second variant (402b) of roughening by grinding (FIGS. 16a-b), which is also called lapping, instead of said shaft covered with metal brushes there is a series of belt grinders which act on a working surface through which the product is sent, being pulled by a drive; in particular, such grinders operate in such a way as to obtain multiple continuous grooves, having a depth (V2) smaller than 100 micrometres, which are oriented in at least two different directions to form a net-like geometry, wherein the pitch (V4) between two successive and parallel grooves is between 0.1 mm and 0.2 mm.

In more detail as to the third variant (30c, 40c) of combined roughening (FIGS. 12a-b), it is easily carried out by producing a sheet provided with a porous surface (401a-b, 411a-b) according to at least one of the above-described processes, wherein then said cut surface (402a-b, 411c-d) is also made by means of a mechanical action according to at least one of the above-described processes.

Finally, it is observed that each reference to said membranes of the roughened type (40, 40b, 40c), according to the above-described and represented embodiment configurations (FIGS. 9-16), is meant to be included in the advantageous embodiment configuration according to invention (10a, 10b), in particular as in said detail sections (FIGS. 3a, 3b, 4a, 4b).

REFERENCE

(10) separating membrane of the bossed type, according to the invention, in a first variant (10a) with chambers provided with an internal crown with flattened edges, or in a second variant (10b) with chambers provided with an internal crown with inclined lower edge;
(100) waterproof extruded sheet;
(101) permeable base layer, of a nonwoven fabric;
(102) boss, protruding from the lower face, in the cylindrical base configuration (102a) or double grouped (102b) or triple grouped (102c);
(103) internal chamber of the boss, open on the upper face;
(104) internal crown, continuous and protruding to form a necking which divides the chamber into two compartments, an upper compartment above it and an undercut lower compartment, said crown in the first variant having superimposed edges (104a) or in the second variant having the lower edge inclined (104b);
(105) upper compartment, above the crown;
(106) lower compartment, which is formed by the necking, corresponding to said internal crown, and by the underlying widening;
(107) widening below the internal crown;
(108) upper edge of the internal crown;
(109) lower edge of the internal crown, undercut;
(110) upper face of the membrane, facing upwards;
(111) lower face of the membrane, facing downwards;
(112) contact surface between the head of the boss and the base layer;
(113) non-bossed surface of the sheet, at the extrados;
(114a) membrane portion in the base configuration with cylindrical bosses;
(114b) membrane portion in the variant with two by two grouped bosses;
(114c) membrane portion in the variant with three by three grouped bosses;
(114d) membrane portion in the combined variant, single-grouped;
(200) forming roller;
(201a-b) protrusion which forms the boss, in the two variants for forming the internal crown, respectively in the first variant with superimposed edges (201a) or in the second variant with inclined lower edge (201b);
(202a-b) main notch, intended to form the internal crown, in the rectangular variant (202a) or in the triangular variant at 45° (202b);
(203) secondary notch at the base of the protrusion, intended to facilitate the forming of the boss;
(204) first portion of the protrusion of the roller, cylindrical, in correspondence of the secondary notch;
(205) second portion of the protrusion of the roller, cylindrical, in correspondence of the greater diameter;
(206a-b) third portion of the protrusion of the roller in correspondence of the internal crown, in the two embodiment variants: cylindrical (206a) with the smaller diameter, or shaped as a truncated cone (206b);
(207) fourth portion of the protrusion of the roller, cylindrical, in correspondence of the widening underlying the internal crown;
(30a-c) production process for roughening a bossed membrane, according to the invention, realizing a roughening configuration of the type: with porous surface (30a), with cut surface (30b) or with both porous and cut combined surface (30c);
(40a-c) roughened membrane, according to the invention, in a first roughening configuration (40a) with porous surface, or in a second configuration (40b) with cut surface, or in a third configuration (40c) with both porous and cut combined surface;
(400) plastic sheet;
(401) porous roughening surface, in a first variant (401a) with superficial microcavities in the form of single micropores, or in a second variant (401b) with superficial microcavities in the form of composite pores;
(402) cut roughening surface, in a first variant (402a) with superficial microcavities obtained by brushing in the form of discontinuous grooves or in a second variant (402b) with superficial microcavities obtained by grinding in the form of linear and parallel grooves, in oriented bundles;
(404) smooth surface;
(405) boss protruding from the lower face;
(406) internal chamber of the boss;
(407) side walls of the boss;
(408) head of the boss;
(409) upper face of the membrane, that is to say, facing upwards;
(410) lower face of the membrane, that is to say, facing downwards;
(411a-d) roughening superficial microcavities, in the variants of the type micropores (411a), composite pores (411b), discontinuous grooves obtained by brushing (411c), linear and oriented grooves obtained by grinding (411d);
(412) single crater;
(413) multiple crater;
(414a-b) sub-craters joined to form a multiple crater;
(415) mouth of the crater;
(416) brushing removed chip;
(417a-b) primary and secondary grinding directions;
(418) oriented bundle formed by a group of grinding superficial microcavities, in the form of linear and parallel grooves, being oriented according to a primary direction (418a) and a secondary direction (418b);
($\alpha$) relative angle between the direction of protrusion of the upper edge of the internal crown and the inclined lower edge;
($\beta$) relative angle between the primary and secondary grinding directions;
(D1) greater diameter of the chamber inside the boss;
(D2) smaller diameter, corresponding to the internal crown;
(L) width of the internal crown;
(H) total depth of the chamber;
(H1) depth of the first compartment;
(H2) depth of the second compartment;

(H3) depth of the widening below the internal crown, in correspondence of the fourth portion of the protrusion of the roller;
(P) pitch of the bosses arranged in a matrix;
(S1) total thickness of the bossed sheet.
(V1) width of the superficial microcavity;
(V2) depth of the superficial microcavity;
(V3) thickness of the sheet of plastic material;
(V4) pitch between the superficial microcavities in the form of parallel grooves obtained by grinding.

The invention claimed is:

1. A separating membrane comprising:
an extruded sheet that is bossed and waterproof;
a permeable base layer of a non-woven fabric, said permeable base layer affixed to a lower side of said extruded sheet, said extruded sheet having the bosses arranged in a matrix with a constant pitch so as to protrude downwardly so as to define respective chambers open on an upper face of said extruded sheet, the respective chambers adapted to allow penetration of a bedding cement adhesive, said extruded sheet having a restraint element corresponding to each of the respective chambers and adapted to retain the bedding cement adhesive, the bosses being cylindrical with a double diameter and with an internal crown, the internal crown being continuous and protruding inwardly from sides of the respective chambers, the internal crown having a constant width of at least 0.8 millimeters, the internal crown positioned inside each of the respective chambers so as to form a necking that subdivides each of the respective chambers into at least two superimposed compartments, the at least two superimposed compartments comprising an upper compartment that guides an entry of the bedding cement adhesive and a lower compartment that grips the bedding cement adhesive when hardened, wherein the upper compartment has a depth equal to at least ⅓ of the total depth of the respective chamber and adapted to act as a funnel during laying in order to facilitate a uniformity of a filling of the lower compartment, the lower compartment having the necking corresponding to the internal crown and to an underlying widening, wherein contact surfaces between heads of the bosses and said permeable base layer have at total area between 50% and 75% of a total area of the lower side of said extruded sheet.

2. The separating membrane of claim 1, wherein the pitch is 26 millimeters, the double diameter having a greater diameter of 2.0 millimeters and a smaller diameter of 18 millimeters, the internal crown having a width of one millimeter, the greater diameter being identical to both the upper compartment and the lower compartment, a total depth of a chamber of the respective chambers is between 2.5 millimeters and 7.5 millimeters, wherein the upper compartment has a depth between ⅓ and ½ of a total depth of the chamber, the lower compartment having a depth complementary to the depth of the upper compartment, wherein the underlying widening has a depth at least equal to ⅙ of the total depth of the chamber.

3. The separating membrane of claim 2, wherein the internal crown has edges flattened one on top of another in a orthogonal direction with respect to said walls of the chamber.

4. The separating membrane of claim 2, wherein the internal crown has a lower edge inclined by 45° with respect to a lower edge such that the underlying widening has a depth at least equal to ⅙ of the total depth of the chamber.

5. The separating membrane of claim 1, wherein the bosses are individually aligned cylindrical bosses that covers 50% of a total area of the lower side of said extruded sheet.

6. The separating membrane of claim 1, wherein the bosses are double grouped two by two that covers 66% of the total area of the lower side of said extruded sheet.

7. The separating membrane of claim 1, wherein the bosses are triple grouped three by three so as to cover 75% of the total area of the lower side of said extruded sheet.

8. The separating membrane of claim 1, wherein the bosses are double grouped or triple grouped alternated with singly bosses so as to cover 55% to 75% of a total area of the lower side of said extruded sheet.

9. The separating membrane of claim 1, wherein said extruded sheet is extruded polyethylene or polypropylene or a mixture thereof, said extruded sheet having a weight of between 350 g/m$^2$ and 1000 g/m$^2$.

10. The separating membrane of claim 9, said extruded sheet being a weight of 500 g/m$^2$ and a thickness of 550 micrometers with a tolerance of +/−20%.

11. The separating membrane of claim 1, wherein the total depth of the chamber is between 3 millimeters and 7 millimeters.

12. The separating membrane of claim 1, wherein at least one face of said extruded sheet is roughened with microcavities, the microcavities opening at an outside thereof and adapted to grip a material joined thereto.

* * * * *